United States Patent [19]

Bunczek et al.

[11] Patent Number: 5,192,561
[45] Date of Patent: Mar. 9, 1993

[54] ASPARTAME STABILITY IN CHEWING GUM USING AN ACID GELATIN SYSTEM

[75] Inventors: Michael T. Bunczek, Dolton; Philip W. Urnezis, Lombard, both of Ill.

[73] Assignee: Wm. Wrigley Jr. Company, Chicago, Ill.

[21] Appl. No.: 932,921

[22] Filed: Aug. 20, 1992

Related U.S. Application Data

[63] Continuation of Ser. No. 762,588, Sep. 19, 1991, abandoned.

[51] Int. Cl.$^5$ .............................................. A23G 3/30
[52] U.S. Cl. ........................................ 426/3; 426/5; 426/96; 426/103; 426/548
[58] Field of Search ............................... 426/3-6, 426/103, 548, 96, 804

[56] References Cited

U.S. PATENT DOCUMENTS

| | | | |
|---|---|---|---|
| 2,886,446 | 5/1959 | Kramer et al. | 426/5 |
| 3,761,288 | 9/1973 | Glicksman et al. | 99/141 A |
| 3,922,369 | 11/1975 | Glicksman et al. | 426/548 |
| 3,928,633 | 12/1975 | Shoaf et al. | 426/96 |
| 3,956,507 | 5/1976 | Shoaf et al. | 426/96 |
| 3,982,023 | 9/1976 | Bahoshy et al. | 426/3 |
| 4,004,039 | 1/1977 | Shoaf et al. | 426/103 |
| 4,059,706 | 11/1977 | Pischke et al. | 426/96 |
| 4,065,579 | 12/1977 | Mackay et al. | 426/3 |
| 4,246,286 | 1/1981 | Klose et al. | 426/3 |
| 4,277,464 | 7/1981 | Reussner et al. | 424/177 |
| 4,384,004 | 5/1983 | Cea et al. | 426/5 |
| 4,528,204 | 7/1985 | Shank | 426/548 |
| 4,554,167 | 11/1985 | Sorge et al. | 426/285 |
| 4,671,961 | 6/1987 | Patel et al. | 426/3 |
| 4,673,577 | 6/1987 | Patel | 426/5 |
| 4,822,621 | 4/1989 | Glass et al. | 426/5 |
| 4,863,745 | 9/1989 | Zibell | 426/5 |
| 4,885,175 | 12/1989 | Zibell | 426/5 |
| 4,931,295 | 6/1990 | Courtright et al. | 426/5 |
| 4,978,537 | 12/1990 | Song | 426/5 |

FOREIGN PATENT DOCUMENTS

| | | |
|---|---|---|
| 0134322 | 3/1985 | European Pat. Off. |
| 61-212255 | 9/1986 | Japan . |
| 2167641 | 6/1986 | United Kingdom ..................... 426/3 |

OTHER PUBLICATIONS

Thesis–"The Studies of the Interaction Between Aspartame and Flavor Vanillin by High Performance Liquid Chromatography", Cha, State Univ. of New Jersey (May, 1986).

Primary Examiner—Jeanette Hunter
Attorney, Agent, or Firm—Willian Brinks Olds Hofer Gilson & Lione

[57] ABSTRACT

The present invention relates to a method of preparing a stabilized sweetener ingredient containing aspartame, a stabilized aspartame sweetener ingredient for use in chewing gum, and a chewing gum composition containing the stabilized aspartame sweetener ingredient. The aspartame is blended with specific amounts of water, inorganic acid and an encapsulating agent to form a homogeneous mixture. The mixture is dried to form the sweetener ingredient. The sweetener ingredient is relatively stable and unreactive in the presence of cinnamon and other aldehyde-based flavoring agents.

23 Claims, 2 Drawing Sheets

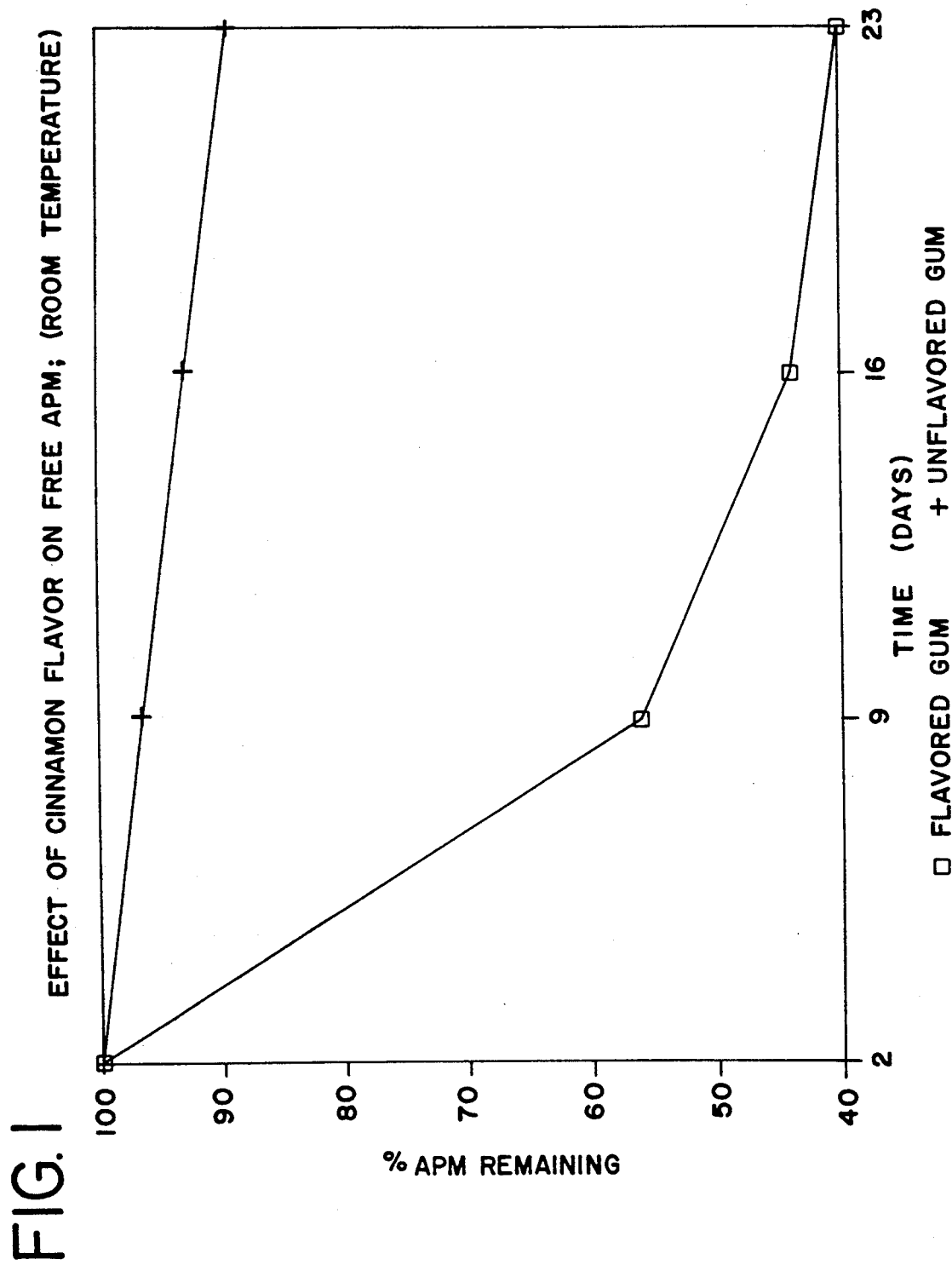

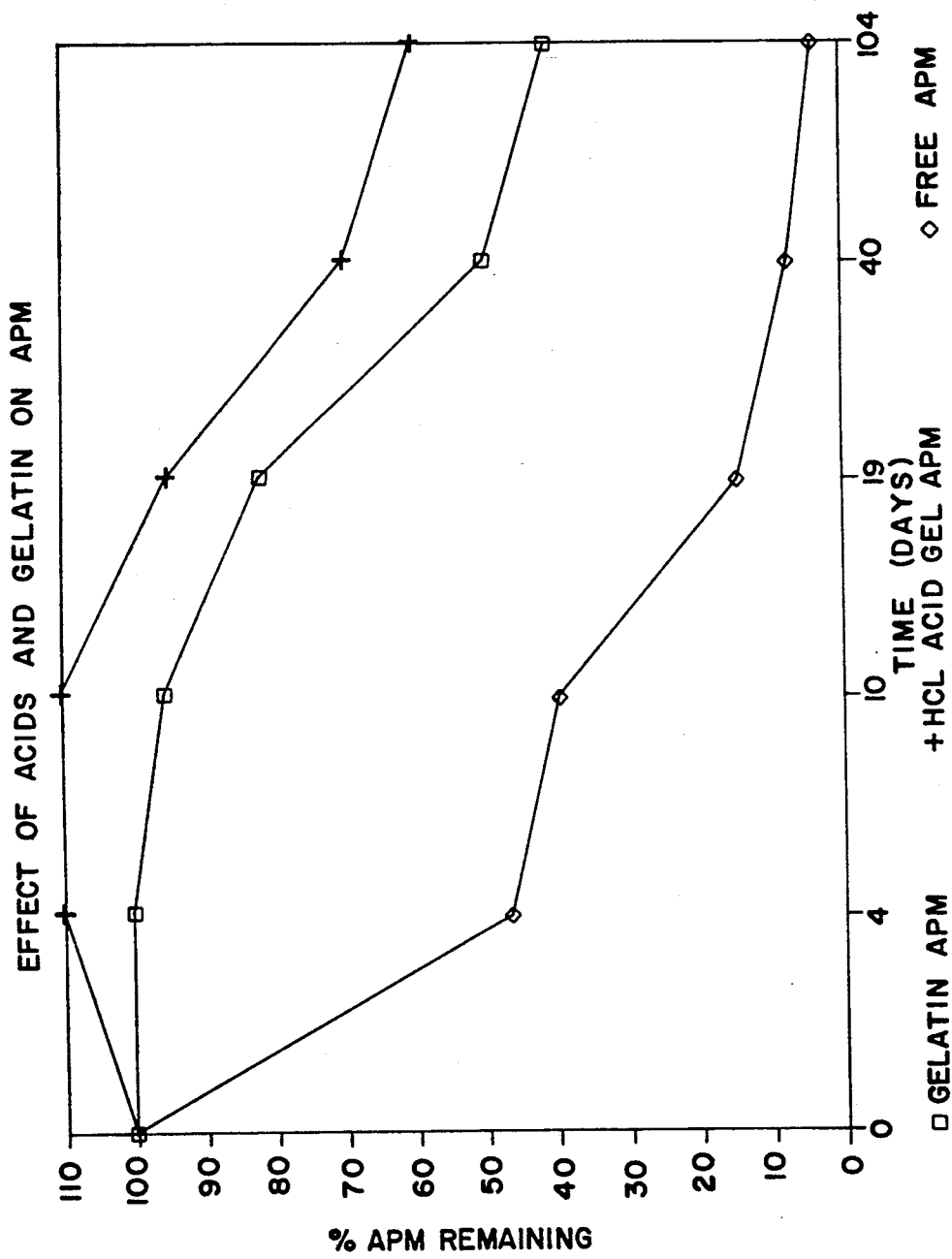

ASPARTAME STABILITY IN CHEWING GUM USING AN ACID GELATIN SYSTEM

This application is a continuation of application Ser. No. 07/762,588, filed Sep. 19, 1991, abandoned.

FIELD OF THE INVENTION

The present invention relates to a method for stabilizing aspartame, when aspartame is used in chewing gum along with aldehyde-type flavors.

BACKGROUND OF THE INVENTION

The artificial sweetener commonly known as aspartame (APM) and identified as the methyl ester of L-aspartyl-L-phenylalanine, has become popular in recent years as a sweetener for chewing gum. However, the use of APM in particular chewing gum compositions which contain cinnamon flavor and/or other aldehyde-type flavors, has been characterized by a high degree of instability. Cinnamon flavor contains cinnamic aldehyde which reacts with APM, causing a loss in flavor and sweetness. Other aldehyde-type flavoring agents contain benzaldehyde, acetaldehyde, etc., which also react with APM. In addition to losing flavor and sweetness, chewing gums containing APM and aldehyde-based flavors can exhibit notable changes in texture, taste and color when stored for short periods of time.

Aspartame reacts chemically with aldehyde flavoring agents and particularly with cinnamic aldehyde. The reaction occurs to a significant extent in chewing gum, within a matter of days. This relatively rapid reaction has, in the past, rendered the use of APM impractical in gums containing cinnamon or other aldehyde-based flavoring agents. This problem is illustrated in FIG. 1, which compares APM stability in cinnamon flavored and unflavored gums.

Methods have been developed for the purpose of attempting to stabilize APM in a chewing gum environment. For instance, Glass et al. U.S. Pat. No. 4,822,621 discloses a technique in which the APM and the flavoring agent are initially blended into two separate gum portions, which are then coextruded together. Prior to chewing of the gum, the contact between the APM and the flavoring agent is generally limited to the interface between the coextruded portions.

Shoaf et al. U.S. Pat. Nos. 3,298,633 and 3,956,507, disclose a technique in which the APM is dispersed in a hot melt and the hot melt is cooled, thereby encapsulating the APM. Examples of hot melt ingredients include anhydrous and hydrous citric acid. Other fusing agents include monosaccharides, poly-saccharides and other materials. These references deal only with food and beverage applications.

Demaso et al. European Application 0 134 322 discloses that a low pH, preferably in the range of 2-3, is the most desirable for APM stability. The reference deals only with a process for incorporating APM into extruded food products including cereals and baked goods.

Klose et al. U.S. Pat. No. 4,246,286 discloses the stabilization of APM in a chewing gum composition, by adjusting the chewing gum pH to between 5.0 and 7.0. This is accomplished by eliminating calcium carbonate filler from the gum. Also, citric acid or another non-toxic organic acid is employed as a bulking agent.

Japanese Publication Sho 61-212255 discloses a sweetener composition containing APM, fructose and small amounts of organic acid and organic acid salts. The organic acid is selected from citric acid, tartaric acid, malic acid, fumaric acid and adipic acid.

Thus, it is known from the prior art that APM behaves in a more stable fashion in an acid environment. However, application of this knowledge to chewing gum compositions has been relatively limited until now.

SUMMARY OF THE INVENTION

The present invention relates to a new and improved method for stabilizing APM in a chewing gum composition which also contains cinnamon flavoring and/or other aldehyde-based flavor materials. By stabilizing the APM, the amount of reaction between APM and flavoring agent is substantially reduced.

An aqueous solution of APM is prepared. A small amount of an inorganic acid, preferably hydrochloric acid, is added to the water. An encapsulating agent, preferably gelatin, is then added to thicken the solution. The solution is then air-dried to form an acid/encapsulant.

The acid/encapsulant is ground into powder. The powder is added to a cinnamon flavored, or other aldehyde flavored chewing gum composition. The acid/encapsulant system causes improved APM stability in chewing gum containing aldehyde based flavoring agents, particularly when hydrochloric acid is used as the inorganic acid.

With the foregoing in mind, it is a feature and advantage of the invention to provide a method for stabilizing APM in cinnamon flavored chewing gum, and in other chewing gums containing aldehyde-based flavoring agents.

It is also a feature and advantage of the invention to provide a stable chewing gum composition containing cinnamon or another aldehyde based flavoring agent, and also containing APM, which retains its sweetness and flavor during storage.

It is also a feature and advantage of the invention to provide an acid/encapsulant sweetener ingredient containing APM, which stabilizes the APM and inhibits or prevents the APM from reacting with cinnamon or other aldehyde-based flavoring agents.

These and other features and advantages of the invention will become apparent from the following detailed description read in conjunction with the accompanying drawings. It should be understood that this description is illustrative rather than limitative, the scope of the invention being defined by the appended claims and equivalents thereof.

BRIEF DESCRIPTION OF THE DRAWINGS

FIG. 1 shows the percent APM remaining in chewing gum as a function of time, using free APM, for unflavored chewing gum and for cinnamon flavored chewing gum.

FIG. 2 shows the improved APM stability resulting from the use of gelatin, and the further improved stability resulting from the use of a hydrochloric acid gelatin encapsulant system.

DETAILED DESCRIPTION OF THE PRESENTLY PREFERRED EMBODIMENTS

In accordance with the presently preferred embodiment, APM is dispersed in water in a concentration of about 40 to about 400 grams of APM per liter of water, more preferably about 100 to about 300 grams of APM per liter and ideally about 150 grams of APM per liter.

Hydrochloric acid (for example, 12N HCl) is added to the aqueous APM solution in an amount of about 0.125 to about 2.5 mols per liter of water, more preferably about 0.25 to about 1.0 mols per liter, and most preferably about 0.50 mols per liter. The maximum APM stability is achieved when about 3.33 mols of hydrochloric acid is added per kilogram of APM.

While hydrochloric acid is preferred, the invention may alternatively be practiced using other acids, such as phosphoric acid. The preferred concentrations listed above may vary depending on the specific type of acid used.

Next, an encapsulating agent, preferably gelatin, is added to the solution of APM, water and acid, in order to thicken the solution. Alternative encapsulating agents include those that are water soluble like agar, alginates, a wide range of cellulose derivatives like ethyl cellulose, methyl cellulose; sodium hydroxymethyl cellulose and hydroxypropylmethyl cellulose, dextrins, maltodextrins, modified starches, and vegetable gums like guar gum, locust bean gum, carageenin gum and gum acacia.

The term "gelatin" is defined as a product obtained by the partial hydrolysis of collagen derived from the skin, white connective tissue, and bones of animals. Gelatin derived from an acid-treated precursor is known as Type A. Gelatin derived from an alkali-treated precursor is known as Type B. Other gelatins are referred to as nonspecific. Nonspecific gelatins are manufactured by processes which have some of the properties of Type A and some of the properties of Type B. Gelatin of different types may also be mixed to obtain desired effects.

Type A gelatin typically has a pH of about 3.8 to about 5.5 and a gel strength of about 75 to about 300 Bloom grams. Type B gelatin typically has a pH of about 5.0 to about 7.5 and a gel strength of about 75 to about 275 Bloom grams. Type A gelatin is preferred because of its lower pH. A particularly suitable gelatin for use with the invention is Type A N. F. Gelatin available from the Grayslake Gelatin Company. This gelatin has a gel strength of about 300 Bloom grams and a pH of about 5.0.

The encapsulating agent is added in an amount of about 1.4 to about 4.2 parts by weight of encapsulating agent per part by weight of APM. Preferably, about 2.1 to about 3.5 parts by weight of encapsulating agent are added per part by weight of APM Ideally, about 2.5-3.0 parts by weight of encapsulating agent are added per part by weight of APM. The ideal range may vary depending on the type of encapsulating agent used.

Following the addition of the encapsulating agent, the solution is stirred until it becomes homogeneous and thick. Then, the solution is dried. One way of effectively drying the solution is to spread the solution onto trays, and allow the trays to air dry at an elevated temperature of about 140° F. Other techniques of drying the solution may also be employed without departing from the spirit and scope of the invention.

The dried sweetener ingredient will generally contain about 12 to about 50% by weight APM, about 32 to about 80% by weight encapsulating agent, about 0.1 to about 15% by weight HCl and about 0 to about 8% by weight water. Preferably, the sweetener ingredient will contain about 15 to about 40% by weight APM, about 50 to about 75% by weight encapsulating agent, about 0.5 to about 10% by weight HCl and about 2 to about 6% by weight water. Most preferably, the dried sweetener ingredient will contain about 20-30% by weight APM, about 65-70% by weight encapsulating agent, about 1.0-5.0% by weight HCl and about 3.5% by weight water.

The dried sweetener ingredient, herein referred to as the acid/encapsulant, can then be granulated or preferably ground into powder. The grinding can be accomplished using a Fitzmill, Model D-6, with a 0.027 inch opening screen.

The acid/encapsulant powder is now ready for use in a cinnamon flavored or other aldehyde flavored chewing gum composition. The acid/encapsulant powder can be useful in any chewing gum composition in which APM instability due to the presence of aldehydes might otherwise present a problem. The chewing gum may contain other flavoring agents in addition to an aldehyde-based flavor ingredient. Other flavoring agents may include, but are not necessarily limited to, oils derived from plants and fruits such as citrus oils, mint oils, fruit essences, clove oil, oil of wintergreen, anise and the like. Artificial flavoring agents may also be used either alone or in combination with natural flavoring agents. In general the flavoring agent(s) should be present in the chewing gum in an amount between 0.1 and 15% by weight of the chewing gum, more preferably between 0.2 and 5.0% by weight of the chewing gum and most preferably between 0.5 and 3.0% by weight.

In addition to flavoring agents, a chewing gum composition generally includes a water soluble bulk portion and a water insoluble chewing gum base portion. The water soluble portion dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; elastomers, including glycerol monostearate and glycerol triacetate; and optional ingredients such as antioxidants, colors and emulsifiers. Since a small amount of acid is used in this invention, it is preferable to use a calcium carbonate-free filler, for instance, a talc filler. The gum base constitutes between 5-95% by weight of the chewing gum composition, more typically 10-50% by weight of the chewing gum, and most commonly 20-35% by weight of the chewing gum.

The water soluble portion of the chewing gum generally constitutes between 5 and 95% by weight of the chewing gum, preferably between 20 and 80% by weight of the gum. The bulk portion may include softeners, bulk sweeteners, high intensity sweeteners and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum, preferably between 0.1 and 10% by weight of chewing gum. The softeners may include glycerin, lecithin, and combinations thereof. The softeners may also include aqueous sweetener solutions such as those containing sorbitol, hydrogenated starch hydrolysates, corn syrup and combinations thereof.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present. When used, high intensity sweeteners typically constitute between 0.001–5.0% by weight of the chewing gum, preferably between 0.01–1.0% by weight of the chewing gum. These may include but are not limited to sucralose, aspartame, salts of acesulfame, alitame, saccharin and its salts, cyclamic acid and its salts, dihydrochalcones, thaumatin, monellin, and the like, alone or in combination.

When the acid/encapsulant sweetener ingredient of the invention is used to stabilize aspartame, the acid/encapsulant is added to the chewing gum in an amount of about 0.01 to about 10% by weight of the chewing gum. Preferably, the acid/encapsulant constitutes about 0.02 to about 5.0% by weight of the chewing gum, and most preferably about 0.05 to about 2.0% by weight. The amount of acid/encapsulant may vary according to the amount and type of aldehyde flavoring agent, the specific type of acid used in forming the acid/encapsulant, and other factors.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time. A softener such as glycerin can be added next along with syrup and part of the bulk portion. Further parts of the bulk portion may then be added to the mixer. Flavor ingredients are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

A 3.6 gram quantity of APM was mixed into 24 ml of an aqueous hydrochloric acid solution containing 1 ml of concentrated hydrochloric acid (12N) premixed with 23 ml of water. As the mixture became clear, 10 grams of gelatin was added. The gelatin was Type A N. F. Gelatin from the Grayslake Gelatin Company. The lot used had a gelatin strength of 308 Bloom grams and a pH of 5.1.

The mixture was spread on a tray and dried at 140° F. in a forced air oven overnight, to form an acid/gel. The acid gel was ground using a Fitzmill, Model D-6, using a 0.027 inch opening screen. The ground acid/gel was added to the following chewing gum formula:

| Component | Weight Percentage |
| --- | --- |
| Gum Base | 31.0 |
| Lecithin | 0.2 |
| Sorbitol | 50.4 |
| Mannitol | 6.0 |
| Glycerin | 7.4 |
| Cinnamon flavor | 2.8 |
| APM acid/gel | 0.2 |
| Water | 2.0 |

EXAMPLE 2

A 3.6 gram quantity of APM was mixed into 4 ml of water. To this was added 10 grams of the same gelatin used in Example 1. The mixture was spread on a tray and dried at 140° F. in a forced air oven overnight. The product was ground according to the procedure used in Example 1 to yield a gelatin powder. The ground powder was added to the same chewing gum formula as in Example 1, except that the APM gelatin powder was used instead of the APM acid/gel.

EXAMPLE 3

A chewing gum composition as in Example 1 was prepared, except that free APM was used instead of the APM acid/gel.

ANALYSES OF SAMPLES

The chewing gum samples from Examples 1–3 were pelletized and stored in sealed pouches at 85° F. The samples were analyzed for APM at various time intervals using high performance liquid chromatography with a UV detector. The results of the analyzes are plotted in FIG. 2.

The APM stabilized with the hydrochloric acid/gel exhibited the greatest stability in cinnamon flavored chewing gum. In this sample, over 70% of the initial APM remained after 40 days, and over 60% remained after 104 days. For the APM stabilized only with the gelatin, slightly more than 50% remained after 40 days, and slightly more than 40% remained after 104 days. For the free (i.e. unstabilized) APM, less than 10% remained after 40 days.

The foregoing test results indicate that APM stabilized with acid and gelatin, in accordance with the invention, reacts slowly enough so as to allow the acid/gel stabilized APM to be used commercially in aldehyde flavored chewing gum compositions.

While the embodiments of the invention disclosed herein are at present considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A method of preparing a sweetener ingredient for use in chewing gum, comprising in the following sequence the steps of:
   mixing aspartame and an inorganic acid with water, to a concentration of about 40 to 400 grams of aspartame per liter of water, and about 0.125 to about 2.5 mols of acid per liter of water, to form an intimate blend;
   mixing an encapsulating agent with the aspartame, acid and water, in an amount of about 1.4 to about 4.2 parts by weight of encapsulating agent per part by weight of aspartame; and
   evaporating the water to form a sweetener ingredient.

2. The method of claim 1, wherein the inorganic acid comprises hydrochloric acid.

3. The method of claim 1, wherein the aspartame is mixed with the acid and water to a concentration of about 100 to about 300 grams of aspartame per liter of water.

4. The method of claim 3, wherein the aspartame is mixed with the acid and water to a concentration of about 150 grams of aspartame per liter of water.

5. The method of claim 1, wherein the inorganic acid is mixed with the aspartame and water to a concentration of about 0.25 to about 1.0 mols of acid per liter of water.

6. The method of claim 5, wherein the inorganic acid is mixed with the aspartame and water to a concentration of about 0.50 mols of acid per liter of water.

7. The method of claim 1, wherein the water and acid are mixed before the aspartame is added.

8. The method of claim 1, wherein the water and aspartame are mixed before the acid is added.

9. The method of claim 1, wherein the encapsulating agent comprises a material selected from the group consisting of gelatin, agar, alginates, cellulose derivatives, dextrins, maltodextrins, modified starches, vegetable gums, and combinations thereof.

10. The method of claim 1, wherein the encapsulating agent comprises a gelatin selected from the group consisting of Type A gelatin, Type B gelatin, nonspecific gelatin and combinations thereof.

11. The method of claim 10, wherein the gelatin comprises Type A gelatin having a gel strength of about 75 to about 300 Bloom grams.

12. The method of claim 1, wherein the encapsulating agent is mixed with the aspartame, acid and water, in an amount of about 2.1 to about 3.5 parts by weight of encapsulating agent per part by weight of aspartame.

13. The method of claim 12, wherein the encapsulating agent is mixed with the aspartame, acid and water, in an amount of about 2.5-3.0 parts by weight of encapsulating agent per part by weight of aspartame.

14. The method of claim 1, further comprising the step of stirring the encapsulating agent, aspartame, acid and water to form a thick, homogeneous solution.

15. The method of claim 1, wherein the evaporation of water is accomplished by spreading the encapsulating agent, aspartame, acid and water onto a tray, and placing the tray in an oven at a temperature of about 140° F.

16. The method of claim 1, further comprising the step of grinding the sweetener ingredient into a powder.

17. A chewing gum composition, comprising:
   between 5-95% by weight of a water insoluble chewing gum base portion;
   between 5-95% by weight of a water soluble bulk portion; and
   between 0.1-15% by weight of a flavoring portion including one or more aldehyde-based flavoring agents;
   the bulk portion including a high intensity sweetener ingredient consisting essentially of about 12 to about 50% by weight aspartame, about 0.1 to about 15% by weight hydrochloric acid, and about 32 to about 80% by weight gelatin;
   whereby the hydrochloric acid stabilizes the aspartame against chemical reaction with the aldehyde-based flavoring agent.

18. The chewing gum composition of claim 17, wherein one of the flavoring agents comprises cinnamic aldehyde.

19. The chewing gum composition of claim 17, wherein one of the flavoring agents comprises benzaldehyde.

20. The chewing gum composition of claim 17, wherein one of the flavoring agents comprises acetaldehyde.

21. The chewing gum composition of claim 17, wherein the high intensity sweetener ingredient constitutes between 0.01 and 10% by weight of the chewing gum composition.

22. The chewing gum composition of claim 21, wherein the high intensity sweetener ingredient constitutes between 0.02 and 5.0% by weight of the chewing gum composition.

23. The chewing gum composition of claim 22, wherein the high intensity sweetener ingredient constitutes between 0.05 and 2.0% by weight of the chewing gum composition.

* * * * *

UNITED STATES PATENT AND TRADEMARK OFFICE
CERTIFICATE OF CORRECTION

PATENT NO. : 5,192,561
DATED : March 9, 1993
INVENTOR(S) : Michael T. Bunczek et al.

It is certified that error appears in the above-identified patent and that said Letters Patent is hereby corrected as shown below:

Column 1, line 52,       delete "poly-saccharides" and substitute therefore --polysaccharides--.

Column 3, line 48, after "APM" please insert--. --.

Column 6, line 41,       delete "4 ml" and substitute therefore  --24 ml--.

Column 6, line 61,       delete "analyzes" and substitute therefore --analyses--.

Signed and Sealed this

Eighteenth Day of October, 1994

*Attest:*

BRUCE LEHMAN

*Attesting Officer*      Commissioner of Patents and Trademarks